United States Patent
Lin et al.

(10) Patent No.: US 7,508,471 B2
(45) Date of Patent: Mar. 24, 2009

(54) TRANSFLECTIVE LIQUID CRYSTAL DISPLAY

(75) Inventors: Ching-Huan Lin, Sinying (TW); Chih-Ming Chang, Zhongli (TW); Ching-Yu Tsai, Hsinchu (TW); Meng-Chang Tsai, Chiayi (TW); Ting-Jui Chang, Taipei (TW)

(73) Assignees: Fujitsu Limited, Kanagawa (JP); Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/105,097

(22) Filed: Apr. 17, 2008

(65) Prior Publication Data

US 2008/0192187 A1    Aug. 14, 2008

Related U.S. Application Data

(63) Continuation of application No. 10/857,292, filed on May 28, 2004, now Pat. No. 7,379,135.

(51) Int. Cl.
*G02F 1/1335*    (2006.01)

(52) U.S. Cl. .................. 349/114; 349/139; 349/138

(58) Field of Classification Search ............... 349/114, 349/106, 138, 38, 139, 123, 141, 143, 187, 349/43
See application file for complete search history.

(56) References Cited

U.S. PATENT DOCUMENTS

| | | | | |
|---|---|---|---|---|
| 5,641,974 | A | * | 6/1997 | den Boer et al. .............. 257/59 |
| 6,879,361 | B2 | * | 4/2005 | Moon et al. ................. 349/114 |
| 6,956,632 | B2 | * | 10/2005 | Ozawa et al. ................ 349/114 |
| 2004/0165129 | A1 | * | 8/2004 | Okumura ..................... 349/114 |
| 2004/0218123 | A1 | * | 11/2004 | Park et al. ................... 349/114 |

* cited by examiner

*Primary Examiner*—Thoi V Duong
(74) *Attorney, Agent, or Firm*—David I. Roche; Baker & McKenzie LLP

(57) ABSTRACT

A pixel electrode structure of a transflective liquid crystal display comprises a reflective electrode laid on a surface of the gate-insulating layer, a dielectric layer covering the reflective electrode, and a transmissive electrode on the dielectric layer and connected to the reflective electrode.

20 Claims, 11 Drawing Sheets

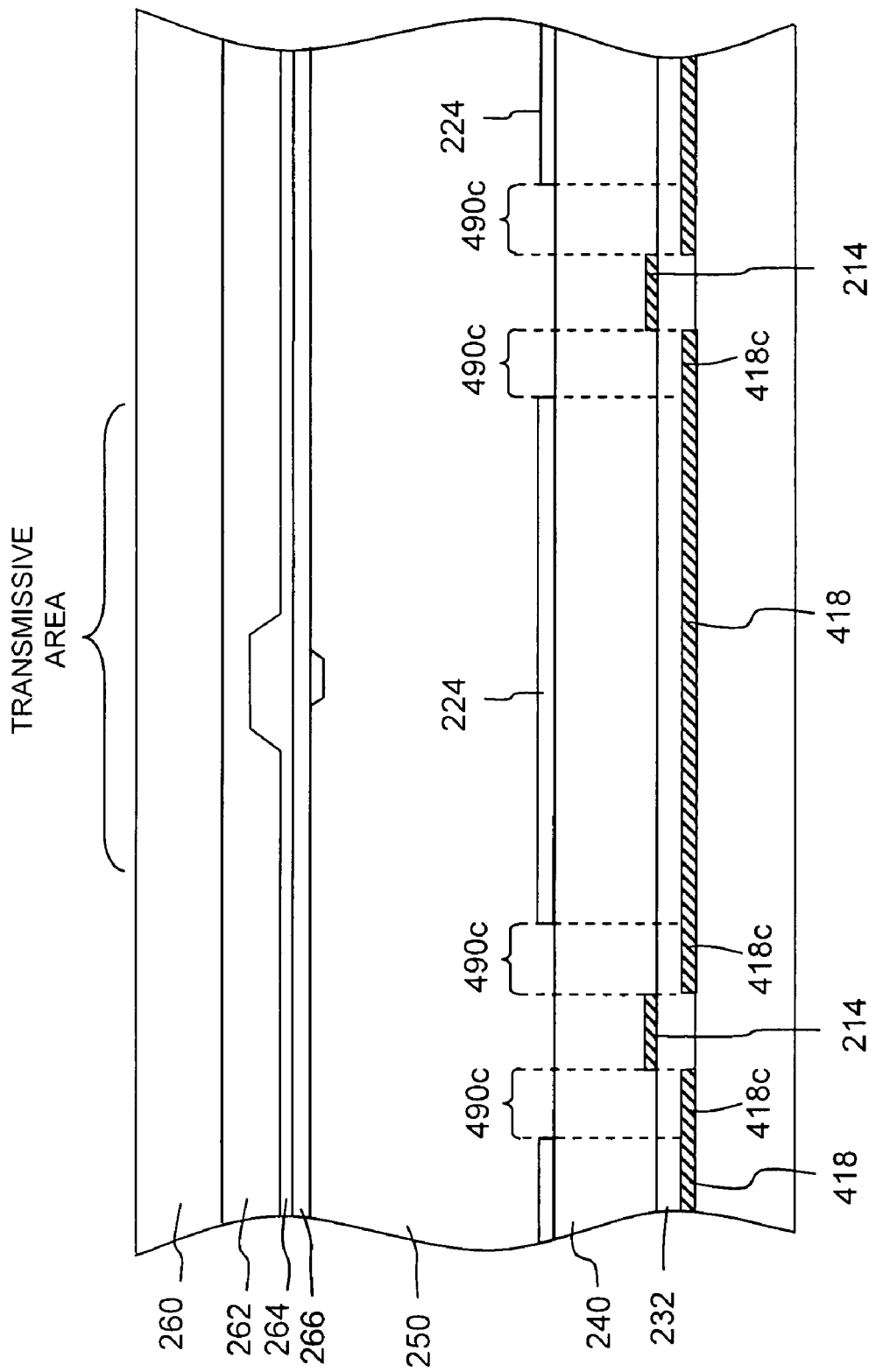

TRANSFLECTIVE LIQUID CRYSTAL DISPLAY

The application claims priority as a continuation under 35 U.S.C. § 120 to U.S. patent application Ser. No. 10/857,292, entitled "Transflective Liquid Crystal Display," filed May 28, 2004 which is incorporated by reference for all purposes.

FIELD OF THE INVENTION

The present invention relates to a transflective liquid crystal display (LCD), and particularly to the pixel structures for a transflective LCD.

DESCRIPTION OF THE RELATED ART

A transflective LCD conventionally displays images under light illumination coming from an external light source and a backlight embedded in the display system. The transflective display mode is advantageous because it has lower power consumption compared to transmissive displays.

FIG. 1 is a general schematic view of a pixel structure known in conventional transflective LCD panels. The conventional transflective LCD panel includes the assembly of rear and front substrates 100, 160, made of transparent materials. Display is viewed from the side of the front substrate 160 while the backlight (not shown) is placed on the side of the rear substrate 100. A liquid crystal layer 150 is sandwiched between the rear substrate 100 and the front substrate 160 to modulate incoming light and thereby achieve image display.

The pixel electrode structure conventionally includes a reflective electrode 126 placed adjacent to a transmissive electrode 124. Both reflective electrode 126 and transmissive electrode 124 thereby respectively define a reflective area and a transmissive area. The reflective electrode 126 is composed of a reflective plate made of a metallic material having suitable reflectance, while the transmissive electrode 124 is conventionally made of a transparent conductive material such as indium-tin-oxide or indium-zinc-oxide.

In the transmissive area, light 182 coming from a backlight (not shown) travels through the transmissive electrode 124, and transmits via the liquid crystal layer 150 to emerge at the viewer side for displaying images. In the reflective area, light 184 comes from an external light source on the viewer side (not shown), travels through the liquid crystal 150, reflects on the reflective electrode 126, and travels again through the liquid crystal 150 to emerge at the viewer side.

One factor indicative of the LCD performance is its optical efficiency. The optical response depends upon the cell retardation of the liquid crystal, characterized by the product "dΔn", wherein d is the cell gap and Δn is the average birefringence of the liquid crystal within the cell gap. In the transmissive area, the optical retardation conventionally is optimal for dΔn~(½)λ, while in the reflective area it is optimal for dΔn~(¼)λ. One technical issue encountered in a conventional transflective LCD such as the one described in FIG. 1 is that the same cell retardation occurs in both reflective area and the transmissive area. No optimal optical performance therefore can be obtained in both reflective and transmissive areas of the conventional transflective LCD.

Therefore, there is presently a need for a transflective liquid crystal display that has improved optical characteristics in both reflective and transmissive areas.

SUMMARY OF THE INVENTION

The application describes a pixel electrode structure of a transflective LCD. The transflective LCD includes the assembly of a first substrate and a second substrate between both of which is sandwiched a liquid crystal layer, wherein the second substrate includes a gate line, a data line, a gate-insulating layer covering the gate line, a switching device connected to the gate line and the data line, and a pixel area adjacent to the gate line and the data line.

In one embodiment, the pixel electrode structure comprises a reflective electrode laid on the gate-insulating layer, a dielectric layer covering the reflective electrode, and a transmissive electrode on the dielectric layer and connected to the reflective electrode.

In one embodiment, the dielectric layer has a low dielectric constant of about 3.5 or smaller. In a variant embodiment, the dielectric layer has a thickness of about 1.7 μm to 2 μm. In another embodiment, the reflective or transmissive electrode has radiating portions.

In some embodiments, the pixel electrode structure overlaps an area of the gate line. In other embodiments, the transflective liquid crystal display comprises a common voltage electrode underlying the pixel electrode structure. In some embodiments, a portion of the common voltage electrode uncovered by the reflective electrode is located in an area between the reflective electrode and the transmissive electrode. In some variations, a portion of the common voltage electrode uncovered by the pixel electrode structure is located in an area between the data line and the pixel electrode structure. In other variations, a portion of the common voltage electrode uncovered by the pixel electrode structure is located in an area between the pixel electrode structure and the gate line.

The foregoing is a summary and shall not be construed to limit the scope of the claims. The operations and structures disclosed herein may be implemented in a number of ways, and such changes and modifications may be made without departing from this invention and its broader aspects. Other aspects, features, and advantages of the invention, as defined solely by the claims, are described in the detailed description set forth below.

BRIEF DESCRIPTION OF THE DRAWINGS

FIG. 4D is a cross-sectional view taken along section 4D-4D in FIG. 4A; and

DETAILED DESCRIPTION OF THE EMBODIMENT(S)

The application describes a transflective LCD having improved optical response characteristics in the reflective and transmissive areas. Unless otherwise specified, features illustrated similar through the different drawings in the description hereafter will refer to similar elements not repeatedly stated for the sake of conciseness.

Figure 1:
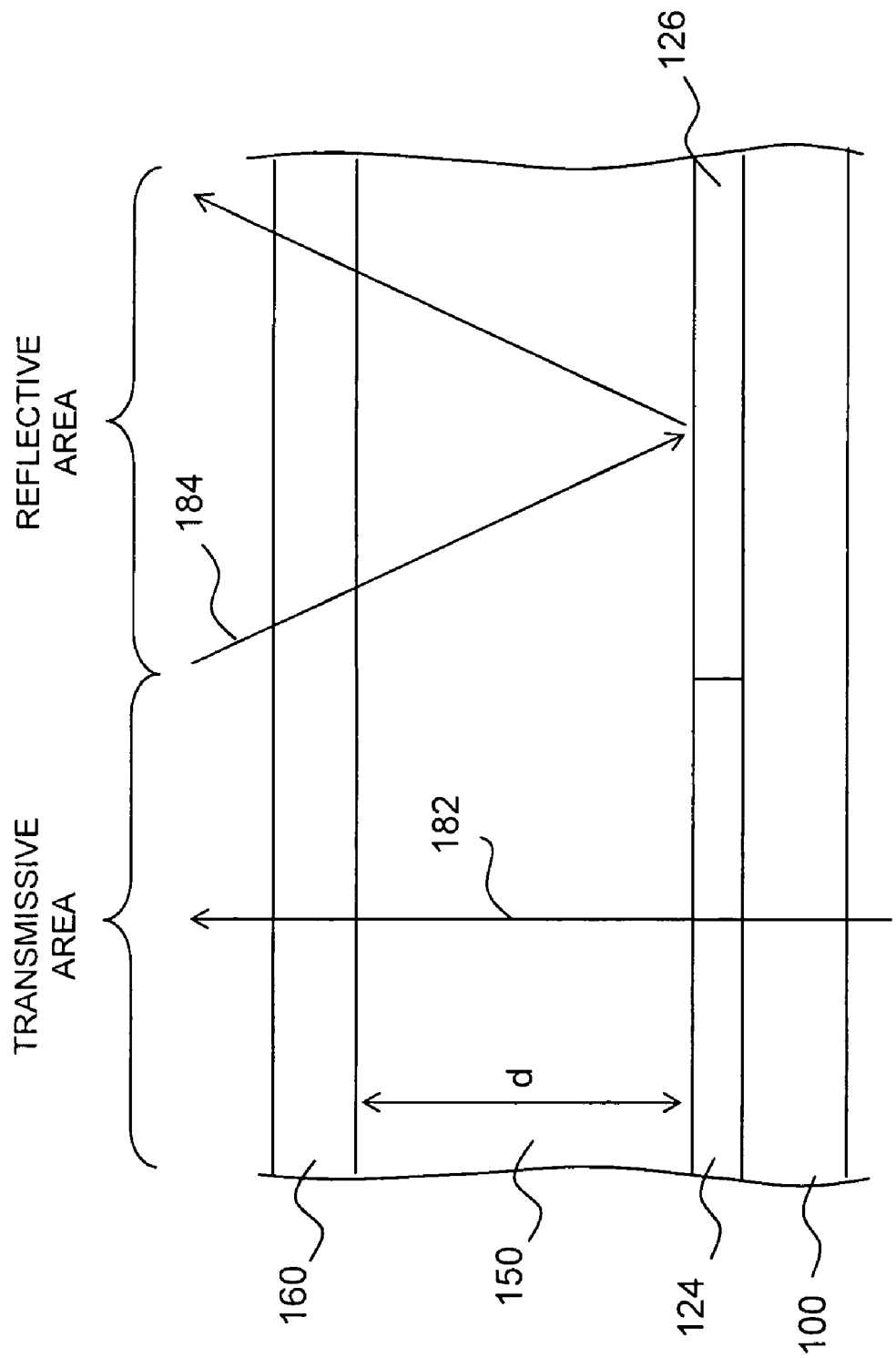
FIG. 1 is a schematic view of a conventional transflective liquid crystal display known in the prior art.
Figure 2A:
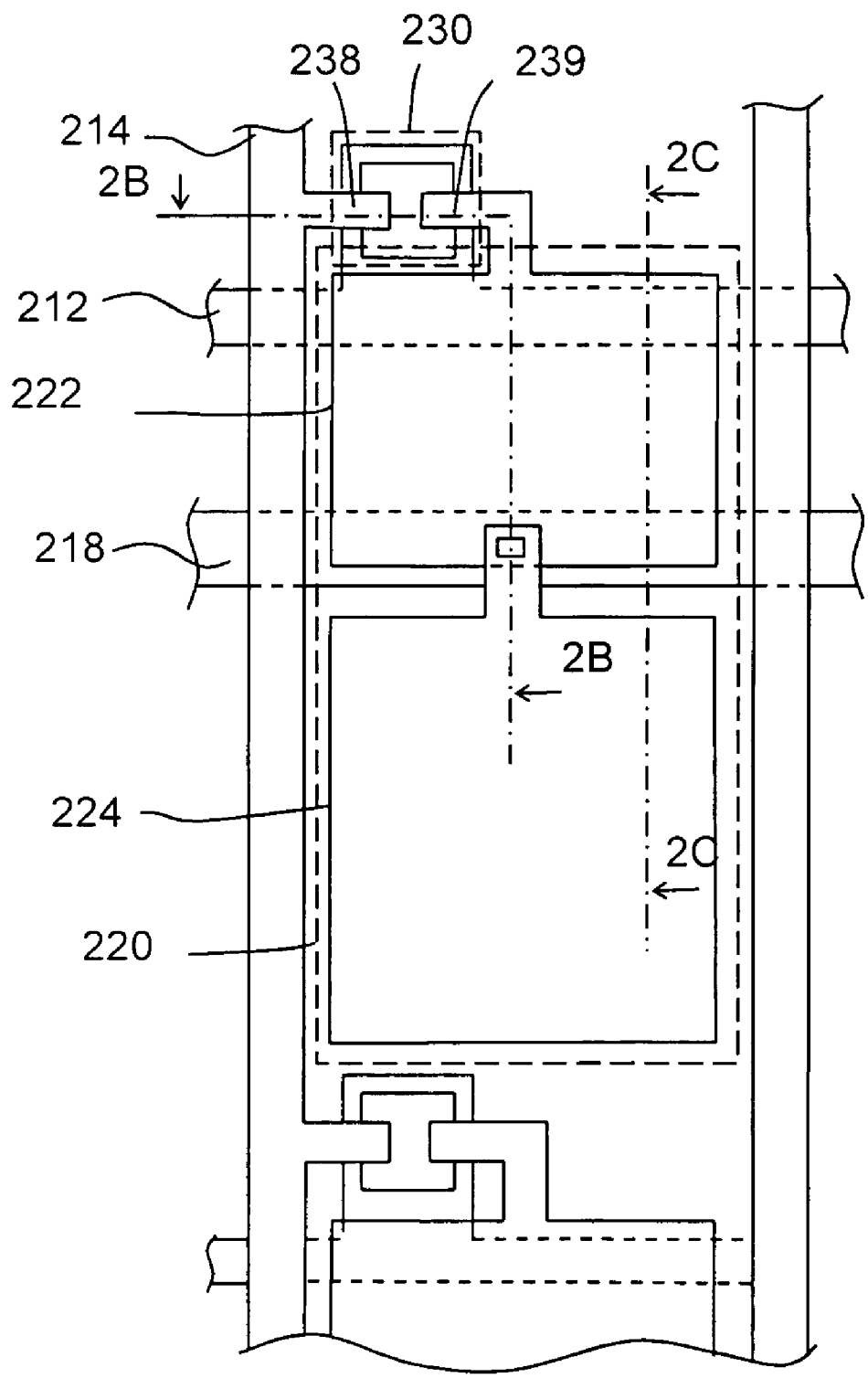
FIG. 2A is a schematic view of a transflective liquid crystal display according to an embodiment of the invention.
Figure 2B:
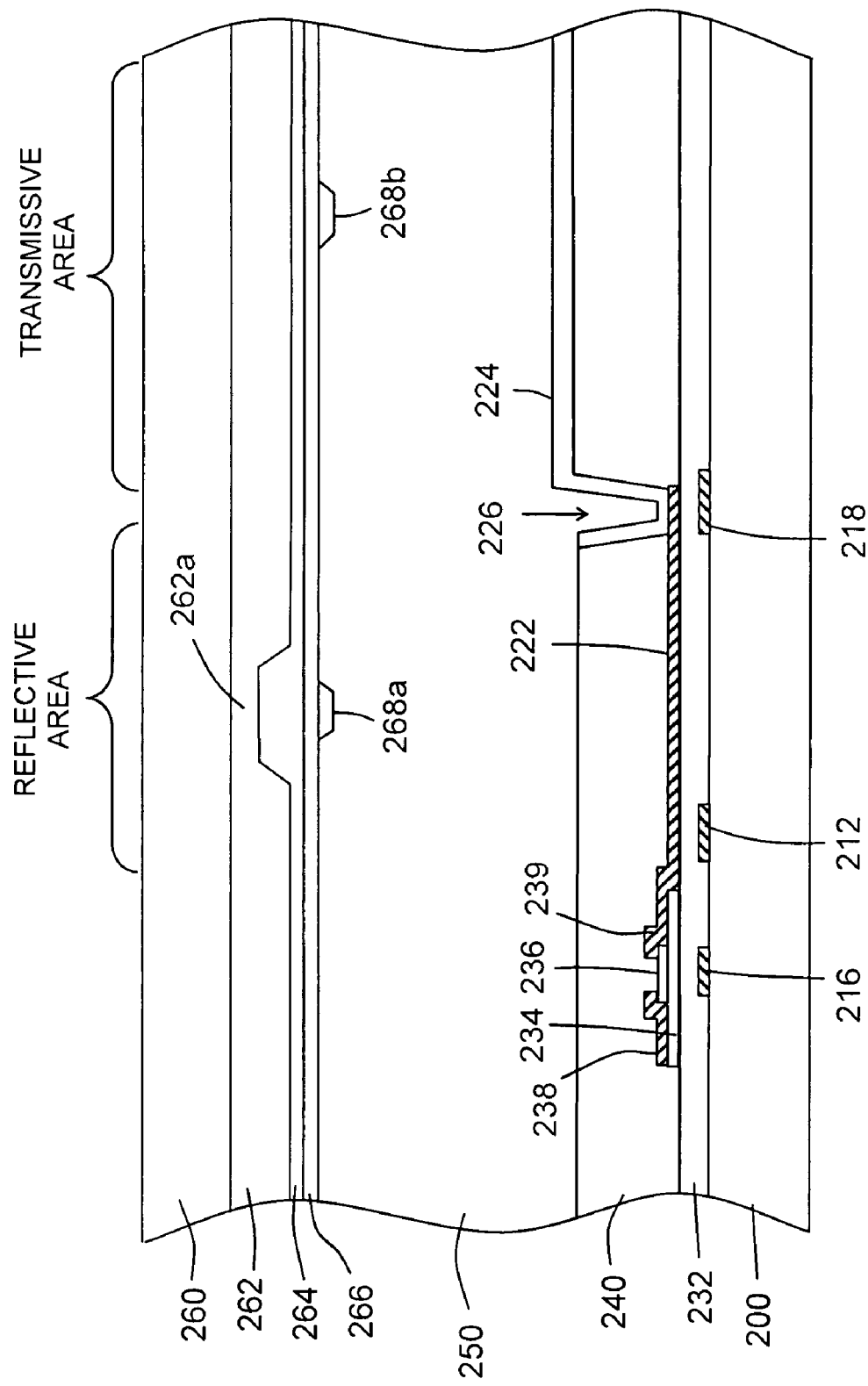
FIG. 2B is a cross-sectional view taken along section 2B-2B in FIG. 2A.
Figure 2C:
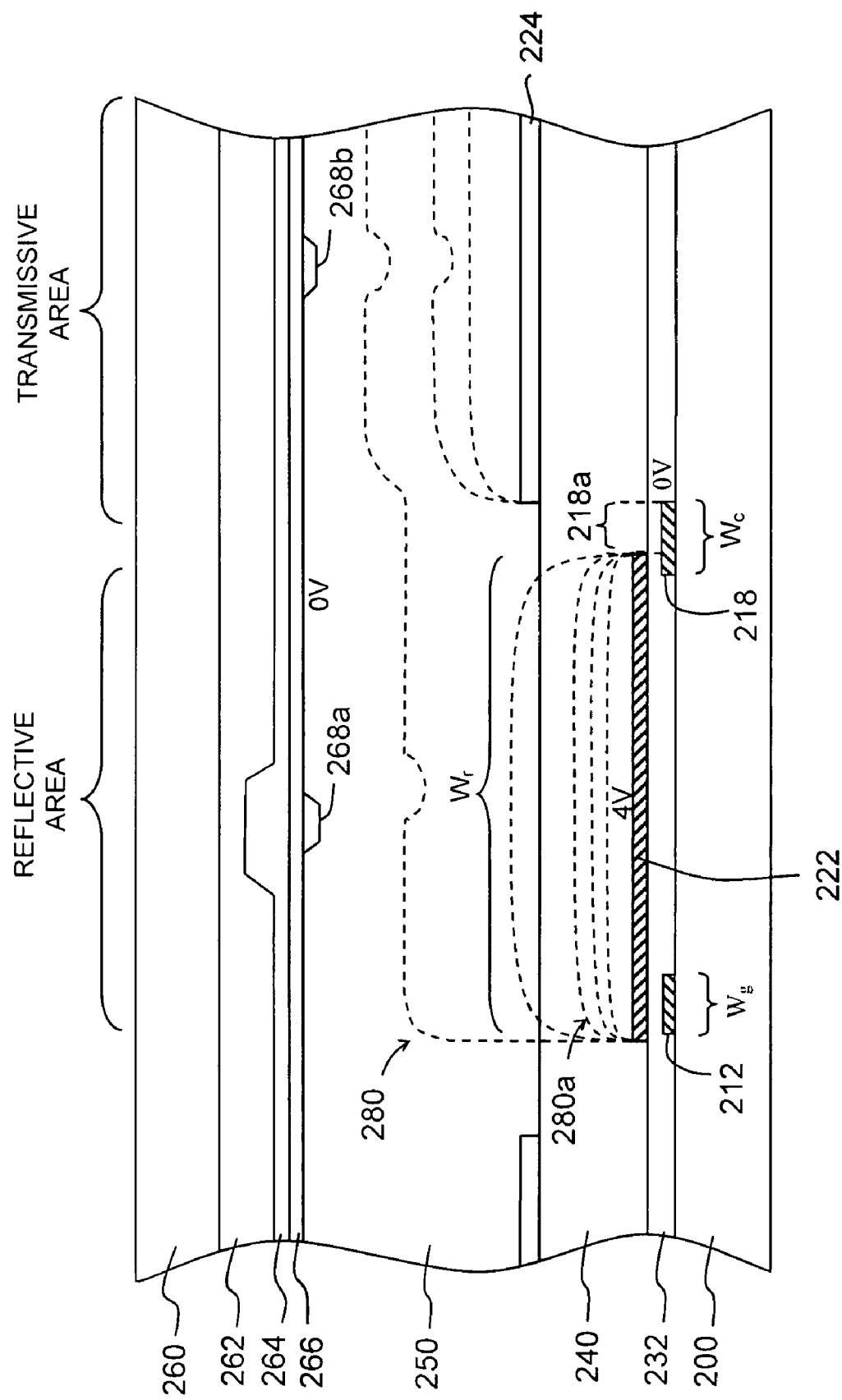
FIG. 2C is a cross-sectional view taken along section 2C-2C in FIG. 2A.

FIGS. 2A~2C are schematic views of a transflective LCD panel according to an embodiment of the invention. FIG. 2A is a top view illustrating an area of approximately one pixel, and FIG. 2B-2C are cross-sectional views respectively taken along sections 2B-2B and 2C-2C in FIG. 2A.

The transflective LCD includes gate lines 212 that perpendicularly intersect data lines 214 to define an array of pixel areas. The gate lines 212 extend into gate pads 216 in each pixel area. In one pixel area is formed a pixel electrode structure, generally designated as reference numeral 220. The pixel electrode structure 220 includes a reflective electrode 222 and a transmissive electrode 224 connected to each other. The reflective electrode 222 constitutes a reflective area, and the transmissive electrode 224 constitutes a transmissive area adjacent to the reflective area.

A switching device 230 is respectively coupled to one data line 214 and one gate line 212 to deliver image signals to the pixel electrode structure 220. The switching device 230 can be a thin film transistor that has a drain electrode 238 connected to the data line 214 and a source electrode 239 connected to the reflective electrode 222. When the switching device 230 is turned on, image data can be supplied via the data line 214 to the pixel electrode structure 220 for displaying images.

FIG. 2B is a cross-sectional view taken across section 2B-2B of FIG. 2A. The transflective LCD includes a rear substrate 200 and a front substrate 260 assembled parallel to each other to form a cell gap filled with a liquid crystal 250. The rear, front substrates 200, 260 can be made of a transparent material such as glass, quartz or the like.

The gate line 212, the gate pad 216, and a first common voltage electrode 218 are formed on a surface of the substrate 200. The gate line 212, gate pad 216 and first common voltage electrode 218 can be formed via patterning a first conductive metal layer made of aluminum (Al), Al alloy, chromium (Cr), molybdenum (Mo), niobium (Nb) or the like.

A gate-insulating layer 232 is formed over the rear substrate 200 to cover the gate pad 216, the gate line 212 and the first common voltage electrode 218. The gate-insulating layer 232 can be silicon oxide or silicon nitride formed by chemical vapor deposition. A channel layer 234 is formed on the gate-insulating layer 232 across the area of the gate pad 216. In an example of processing method, the channel layer 234 can be doped amorphous silicon formed by plasma-enhanced chemical vapor deposition.

A cap layer 236 is formed on the channel layer 234 at an area above the gate pad 216. The cap layer 236 can be made of silicon nitride. Drain and source electrode 238, 239 are formed on the channel layer 234, respectively at two sides of the cap layer 236. In an example of processing method, the cap layer 236 can be used as etching stop while patterning a second conductive metal layer to define the drain and source electrodes 238, 239. The gate pad 216, gate-insulating layer 232, drain electrode 238 and source electrode 239 constitute a thin film transistor 230 operable as switching device to deliver image signals to the pixel electrode structure 220.

The reflective electrode 222 is formed on the surface of the gate-insulating layer 232. The reflective electrode 222 connects to the source electrode 239, and extends to an area overlapping the first common voltage electrode 218. The reflective electrode 222, the source electrode 239 and the drain electrode 238 can be formed via patterning a same conductive metal layer having a suitable reflectance.

A dielectric layer 240 is formed over the substrate 200 to cover the thin film transistor 230 and the reflective electrode 222. The characteristics of the dielectric layer 240, in particular its thickness and its dielectric constant, are selected to regulate the generation of the electric field in the liquid crystal layer 250. In an embodiment, the dielectric layer 240 is an organic dielectric layer of a low dielectric constant of 3.5, with a thickness of about 1.7 µm to 2 µm. Notwithstanding the foregoing, the dielectric constant of the dielectric layer 240 can be selected to be lower than 3.5.

A transmissive electrode 224 is formed on a surface of the dielectric layer 240. The transmissive electrode 224 can be made of a transparent conductive material such as indium tin oxide, indium zinc oxide or the like. The transmissive electrode 224 connects to the reflective electrode 222 via a contact hole 226 formed through the dielectric layer 240.

As shown in FIG. 2B, a color filter 262, an insulating layer 264, and a second common voltage electrode 266 are sequentially stacked on an inner surface of the front substrate 260. The color filter 262 includes a section 262a relatively thinner at an area facing the reflective electrode 222. The color filter 262 can be formed via a processing method including depositing a color filter material, performing a half-tone exposure to particularly define the section 262a, and etching the color filter material.

Protrusions 268a, 268b are formed on the second common voltage electrode 266 in the reflective area and the transmissive area, respectively. The protrusions 268a, 268b create boundary conditions resulting in a plurality of domains where the liquid crystal molecules respectively tilt in different directions for displaying images to provide a wider viewing angle.

Reference is made to FIG. 2C to describe the operation of the transflective LCD according to an embodiment of the invention. It is understood that the specific operating voltages disclosed herein are provided as examples and many adequate voltages can be implemented to drive the operation of the LCD.

To perform image display, a voltage potential of 0V is respectively applied to the first, second common voltage electrodes 218, 266, while a voltage potential of 4V is applied via the data line to the reflective and transmissive electrodes 222, 224. The resulting voltage difference between the pixel electrode structure and the first, second common electrodes 218, 266 create the equipotential lines 280 through the liquid crystal layer 250.

The levels of the equipotential lines are differently distributed in the reflective and transmissive pixel areas. In the reflective pixel area, a part 280a of the equipotential lines is contained within the dielectric layer 240. The controlled equipotential line distribution results in an electric field, within the liquid crystal layer, which has different strengths in the reflective and transmissive areas. In the present embodiment, the produced electric field is lower in the reflective area than in the transmissive area. As a result, the effective birefringence $\Delta n$ of the liquid crystal can be modified in the reflective area and the transmissive area. The product dΔn characterizing the cell retardation thereby can be controlled and adjusted to obtain an optical performance optimal in both reflective and transmissive areas.

In operation, the liquid crystal display is conventionally driven according to an inversion mode, i.e., each pixel at two successive display frames is supplied with an image signal of inverted voltage bias. To obtain good and stable boundary regions that can distinguish different inclination directions of the liquid crystal molecules, the present application envisions different configurations of the pixel electrode structure as detailed hereafter.

In the embodiment of FIGS. 2A~2C, the reflective electrode 222 covers an area $W_r$ overlapping with the gate line 212 and the first common voltage electrode 218. In the overlapping areas, the width $W_g$ of the gate line 212 is entirely covered by the reflective electrode 222 while the width $W_c$ of the first common voltage electrode 218 has a portion 218a uncovered by the reflective electrode 222. This structure can reduce light leakage due to electric field contribution from the gate line 212 and provides stable domain boundaries in the liquid crystal layer in inversion mode operation.

Figure 3A:
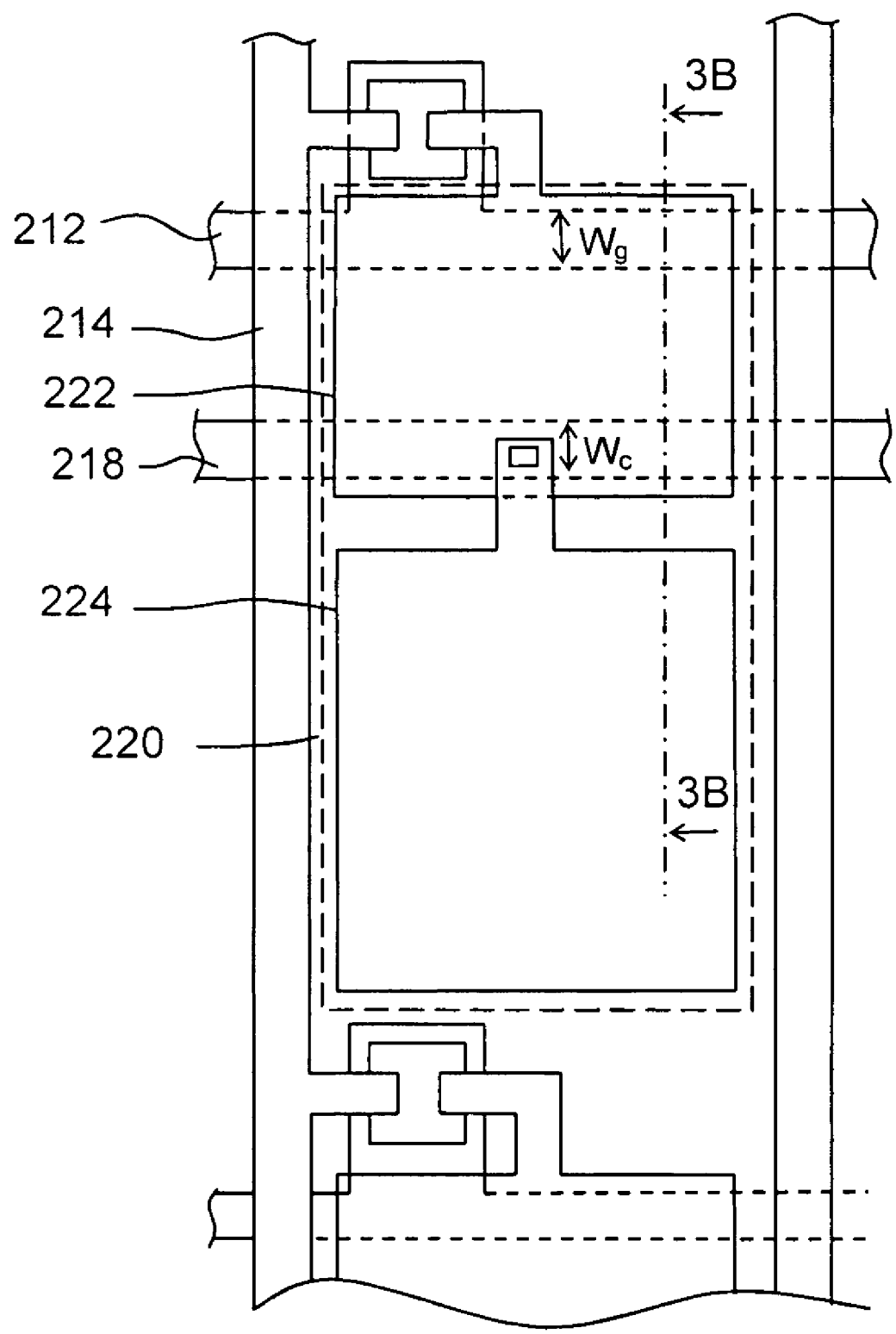
FIG. 3A is a schematic view of a transflective liquid crystal display according to a variant embodiment of the invention.
Figure 3B:
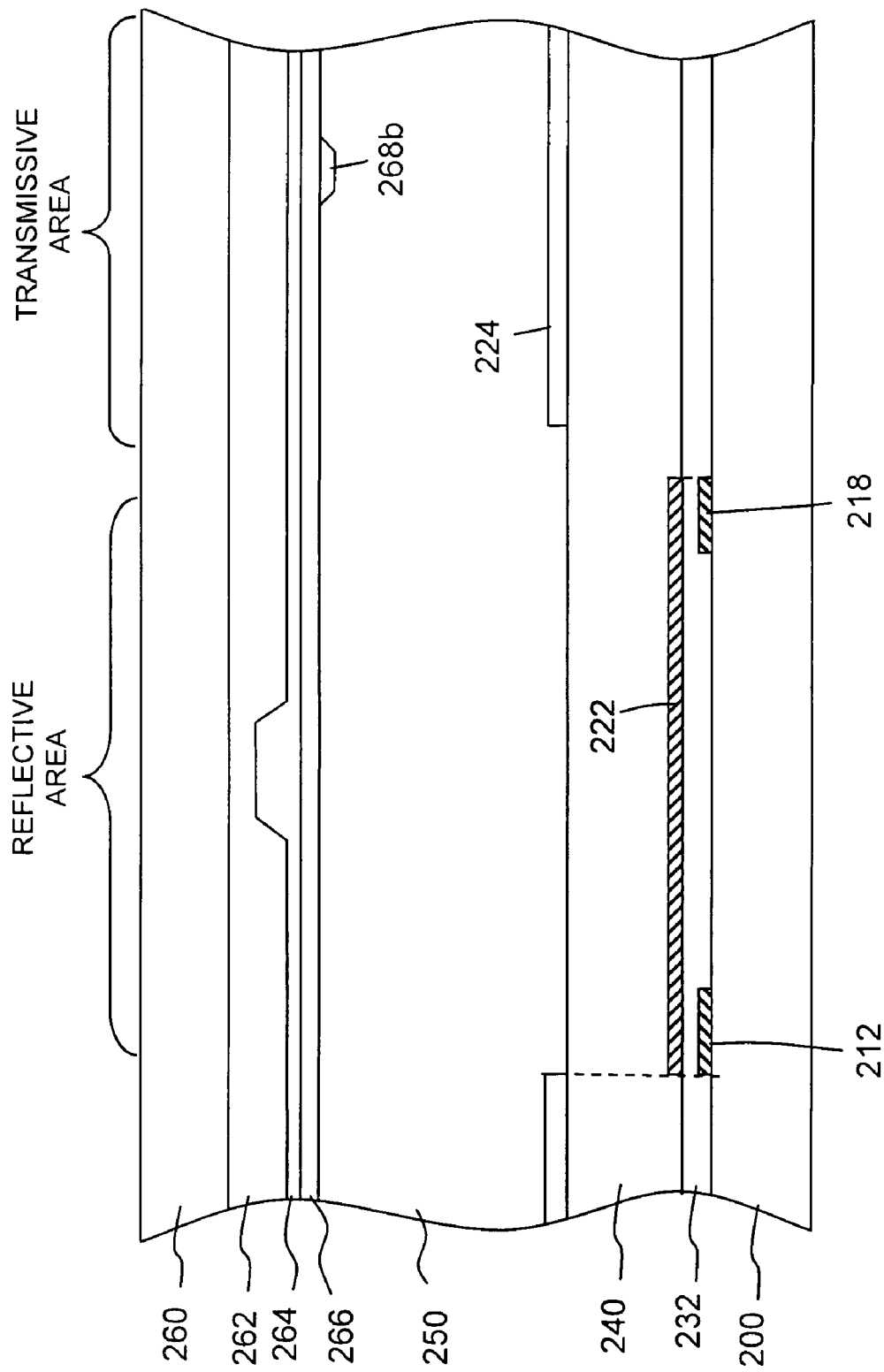
FIG. 3B is a cross-sectional view taken along section 3B-3B in FIG. 3A.
Figure 4A:
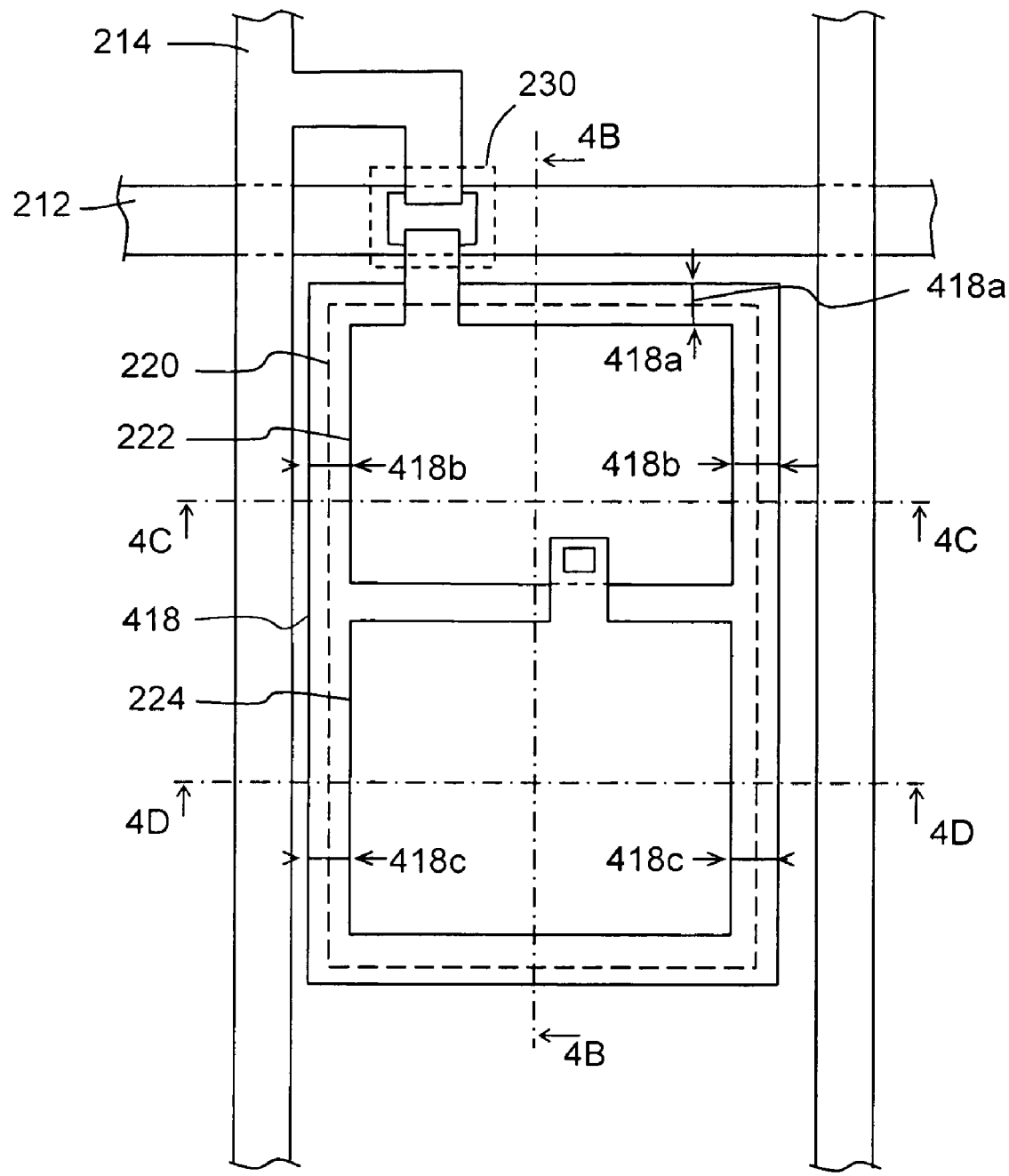
FIG. 4A is a schematic view of a transflective liquid crystal display according to another variant embodiment of the invention.
Figure 4B:
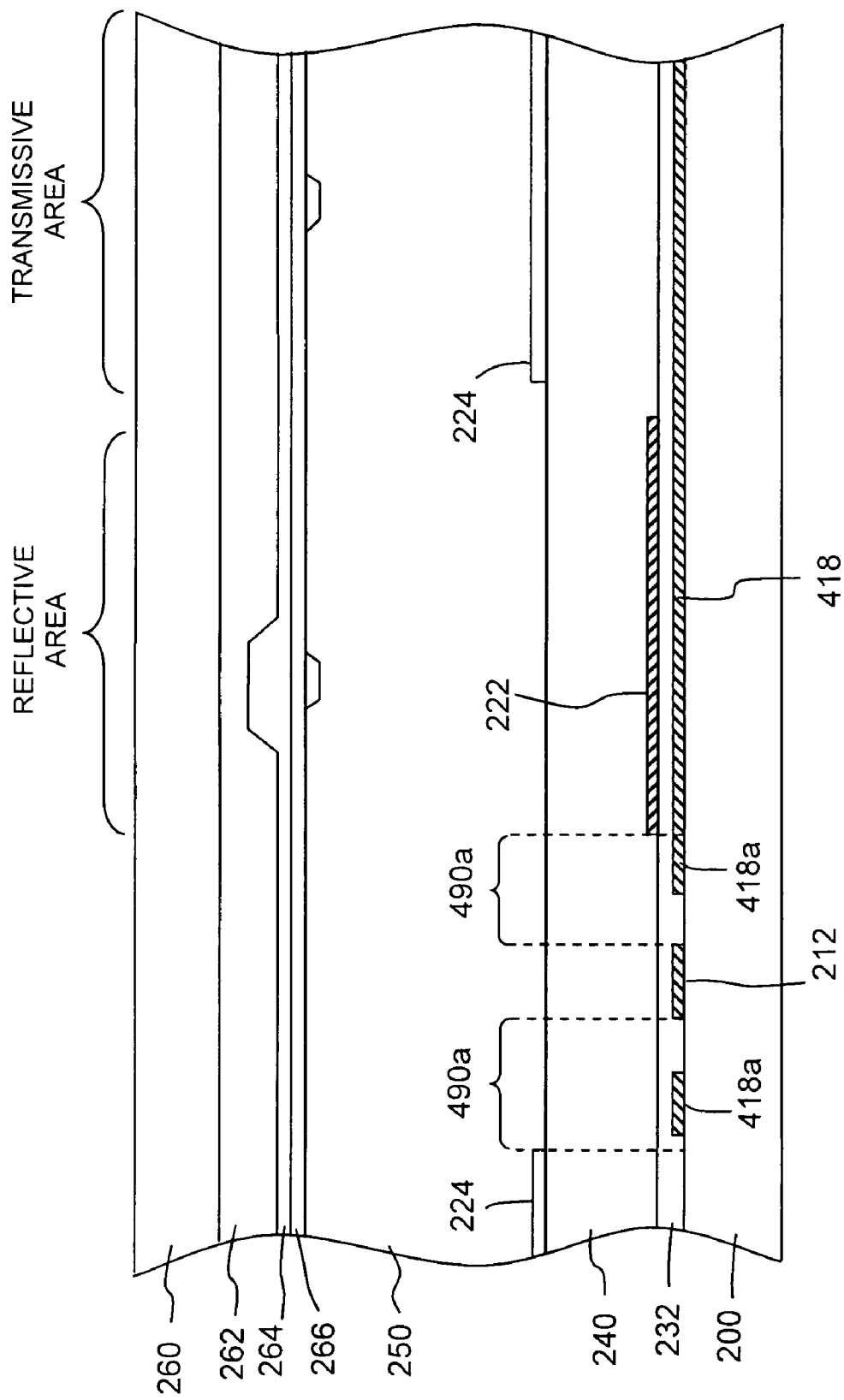
FIG. 4B is a cross-sectional view taken along section 4B-4B in FIG. 4A.
Figure 4C:
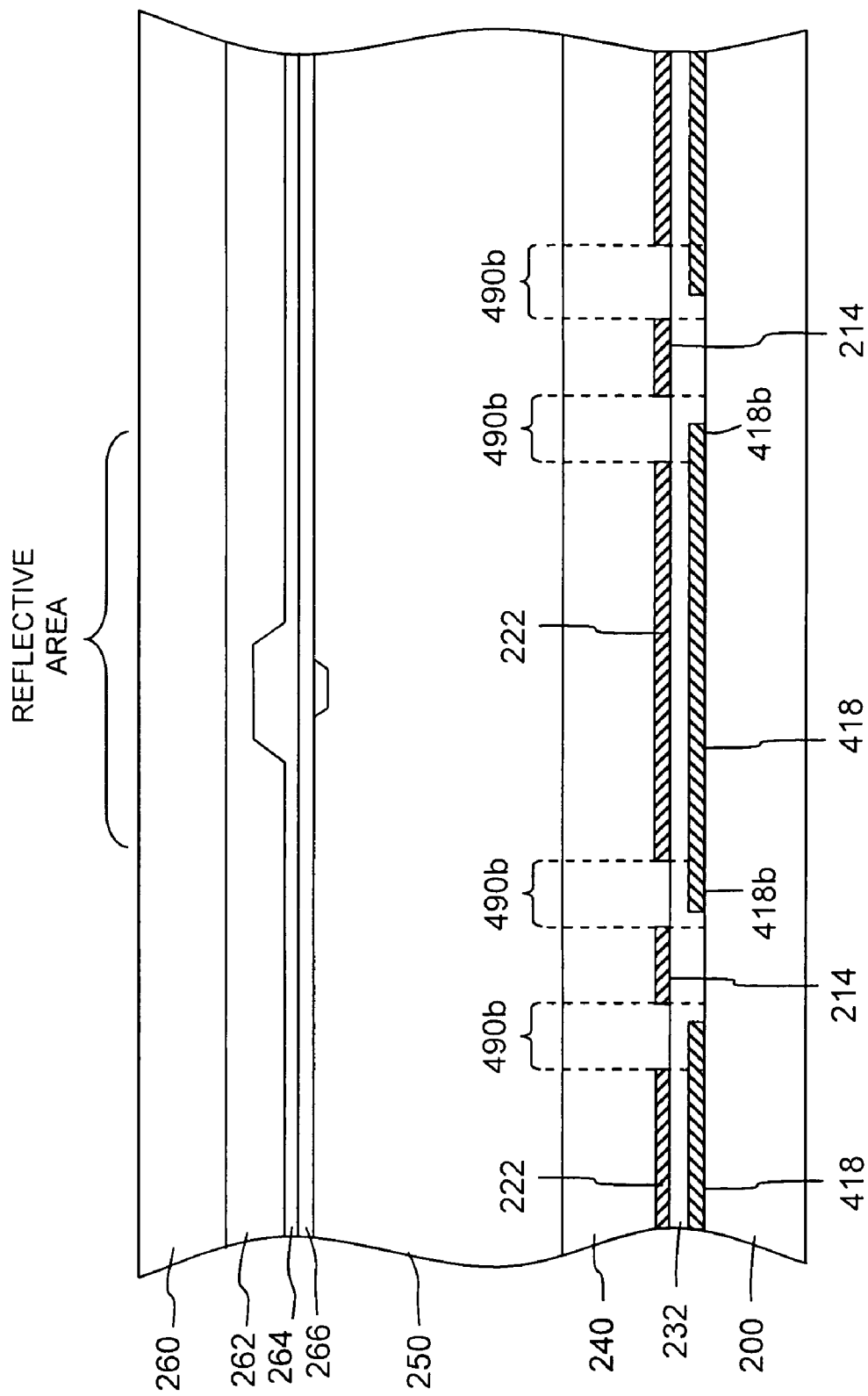
FIG. 4C is a cross-sectional view taken along section 4C-4C in FIG. 4A.

In the variant embodiment of FIGS. 3A-3B, a protrusion 268b is formed on the second common voltage electrode 266 of the front substrate 260 in the transmissive area, while no protrusion is needed in the reflective area. The reflective electrode 222 overlaps with the gate line 212 and the first common voltage electrode 218. In the overlapping areas, the reflective electrode 222 entirely covers the width $W_g$ of the gate line 212 and the width $W_c$ of the first common voltage electrode 218.

In another embodiment shown in FIGS. 4A~4D, the gate line 212 is placed outside the area covered by the pixel electrode structure 220, and the switching device 230 is formed in an area overlapping the gate line 212. The first common voltage electrode 418 includes portions 418a, 418b, 418c uncovered by the reflective, transmissive electrode 222, 224. The portion 418a is located in an area 490a between one gate line 212 and one reflective or transmissive electrode 222, 224 of an adjacent pixel electrode structure 220. The portion 418b is located in an area 490b between one data line 214 and one reflective electrode 222. The portion 418c is located in an area 490c between one data line 214 and one transmissive electrode 224.

Figure 5:
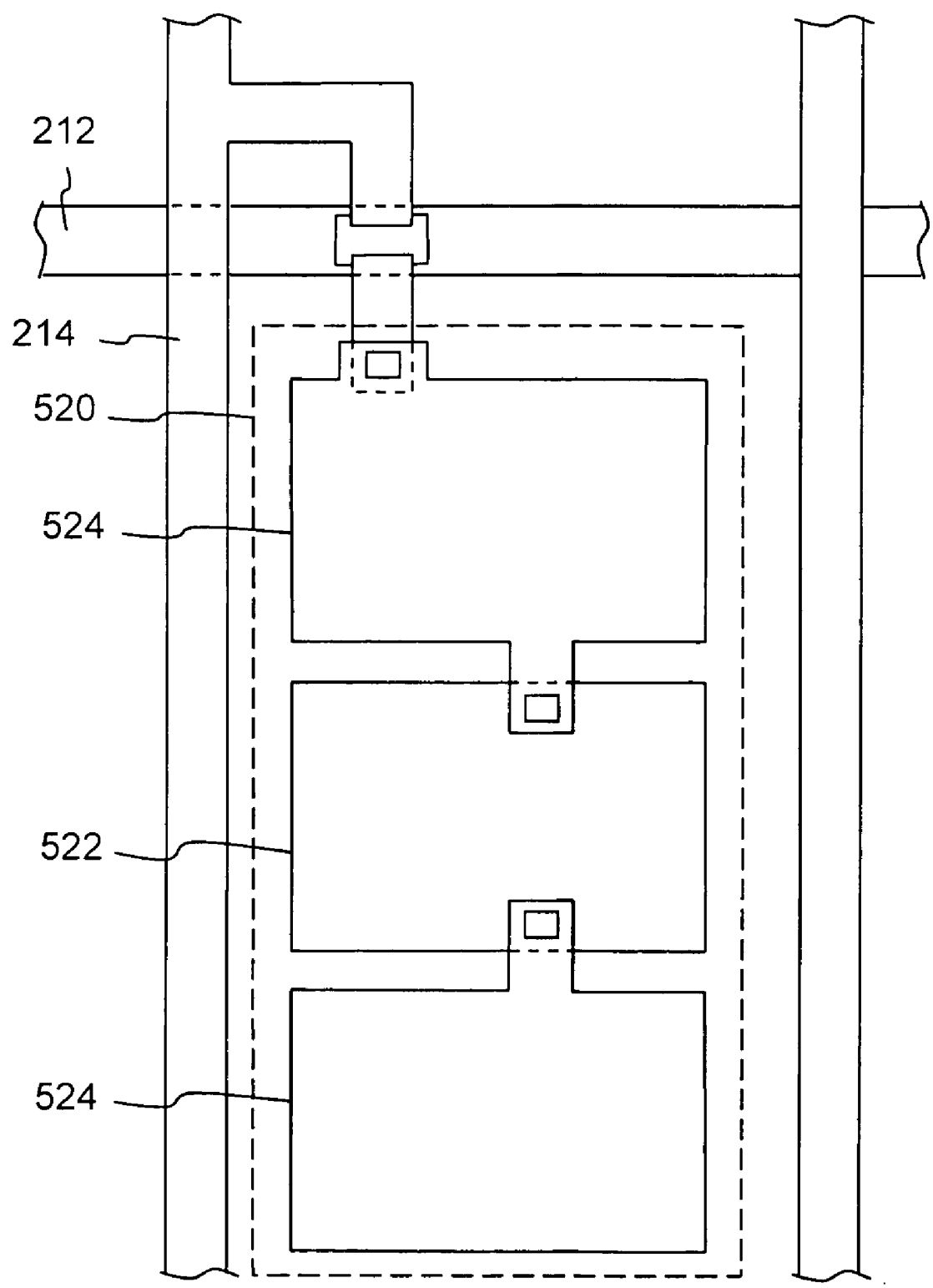
FIG. 5 is a schematic view of a transflective liquid crystal display according to another variation of the invention.

In addition, it is understood that the pixel electrode structure can include a number of reflective and transmissive electrodes. The variation of FIG. 5 illustrates a pixel electrode structure 520 that may include two transmissive electrodes 524 alternated with one reflective electrode 522. More than one reflective and transmissive area can be therefore placed in one pixel.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Additionally, structures and functionality presented as discrete components in the exemplary configurations may be implemented as a combined structure or component. These and other variations, modifications, additions, and improvements may fall within the scope of the invention as defined in the claims that follow.

What is claimed is:

1. A pixel electrode structure for an array substrate of a transflective liquid crystal display, the array substrate includes a gate line, a data line, a gate-insulating layer that covers the gate line and a switching device that respectively connects to the pixel electrode structure, the gate line and the data line, the pixel electrode structure comprises:

a reflective electrode laid on a surface of the gate-insulating layer;
a dielectric layer covering the reflective electrode;
a transmissive electrode on a surface of the dielectric layer and electrically connected to the reflective electrode; and
a common voltage electrode underlying the reflective electrode and the transmissive electrode, wherein a portion of the common voltage electrode uncovered by the reflective electrode is located in an area between the reflective electrode and the transmissive electrode.

2. The pixel electrode structure according to claim 1, wherein the transmissive electrode connects to the reflective electrode via a contact hole through the dielectric layer.

3. The pixel electrode structure according to claim 1, wherein the dielectric layer has a low dielectric constant of about 3.5 or smaller.

4. The pixel electrode structure according to claim 1, wherein the common voltage electrode is configured to receive a voltage signal different from a voltage signal applied to the reflective and transmissive electrode.

5. The pixel electrode structure according to claim 1, wherein the dielectric layer has a thickness of about 1.7 μm to 2 μm.

6. A transflective liquid crystal display, comprising:

a first substrate including a first common voltage electrode;
a second substrate that includes a gate line, a gate-insulating layer covering the gate line, a data line, a switching device coupled to the gate line and the data line, and a pixel area;
a pixel electrode structure formed in the pixel area and coupled to the switching device, wherein the pixel electrode structure includes a reflective electrode on a surface of the gate-insulating layer and a transmissive electrode spaced apart from the reflective electrode via a dielectric layer;
a second common voltage electrode provided on the second substrate at a position underlying the reflective electrode and the transmissive electrode, wherein a portion of the second common voltage electrode uncovered by the reflective electrode is located in an area between the reflective electrode and the transmissive electrode; and
a liquid crystal placed between the first and second substrate.

7. The transflective liquid crystal display according to claim 6, wherein a protrusion is formed over an inner surface of the first substrate at a location opposite to the reflective electrode.

8. The transflective liquid crystal display according to claim 6, wherein a protrusion is formed over an inner surface of the first substrate at a location opposite to the transmissive electrode.

9. The transflective liquid crystal display according to claim 6, wherein the dielectric layer has a low dielectric constant of about 3.5 or smaller.

10. The transflective liquid crystal display according to claim 6, further comprising a color filter placed at an area overlapping with the pixel area, wherein the color filter includes a thinner section in an area corresponding to the reflective electrode.

11. The transflective liquid crystal display according to claim 6, wherein the transmissive electrode is connected to the reflective electrode via a contact hole through the dielectric layer.

12. The transflective liquid crystal display according to claim 6, wherein a second portion of the second common voltage electrode uncovered by the pixel electrode structure is located in a area between the data line and the pixel electrode structure.

13. The transflective liquid crystal display according to claim 6, wherein a third portion of the second common voltage electrode uncovered by the pixel electrode structure is located in an area between the pixel electrode structure and the gate line.

14. The transflective liquid crystal display according to claim 6, wherein the switching device is operable to apply a voltage signal to the reflective and transmissive electrode for generating a gradient of electric potentials that lie across the liquid crystal and the dielectric layer in a region between the first common voltage electrode and the reflective electrode.

15. The transflective liquid crystal display according to claim 14, wherein the gradient of electric potentials produces an electric field that is greater in a first region of the liquid crystal located between the first common voltage electrode and the transmissive electrode than in a second region of the liquid crystal located between the first common voltage electrode and the reflective electrode.

16. The transflective liquid crystal display according to claim 6, wherein the dielectric layer has a thickness of about 1.7 μm to 2 μm.

17. The transflective liquid crystal display according to claim 6, wherein the pixel electrode structure overlaps an area of the gate line.

18. A method for operating a liquid crystal display including a first substrate, a second substrate, and a liquid crystal material sealed between the first and second substrates, wherein the method comprising:

applying a first voltage signal on a first common voltage electrode provided on an inner surface of the first substrate;

applying a second voltage signal on a reflective electrode provided on an inner surface of the second substrate opposing the first common voltage electrode;

applying the second voltage signal on a transmissive electrode adjacent to the reflective electrode on the second substrate, wherein the transmissive electrode is spaced apart from the reflective electrode via a dielectric layer; and applying the first voltage signal on a second common voltage electrode provided on the second substrate at a position underlying the reflective and transmissive electrodes, a portion of the second common voltage electrode being located in an area between the reflective electrode and the transmissive electrode.

19. The method according to claim 18, wherein a voltage difference between the first common voltage electrode and the reflective and transmissive electrodes creates a gradient of electric potentials that lie across the liquid crystal material and the dielectric layer in a region between the first common voltage electrode and the reflective electrode.

20. The method according to claim 19, wherein the gradient of electric potentials produces an electric field that is greater in a first region of the liquid crystal material located between the first common voltage electrode and the transmissive electrode than in a second region of the liquid crystal material located between the first common voltage electrode and the reflective electrode.

* * * * *